Aug. 4, 1931.   J. F. HARTMAN   1,817,141

ELECTRICAL SIDE SLIP FEELER

Filed March 4, 1930

INVENTOR
JAMES F. HARTMAN

ATTORNEYS

Patented Aug. 4, 1931

1,817,141

UNITED STATES PATENT OFFICE

JAMES F. HARTMAN, OF WEST HAZLETON, PENNSYLVANIA, ASSIGNOR TO CROMPTON & KNOWLES LOOM WORKS, OF WORCESTER, MASSACHUSETTS, A CORPORATION OF MASSACHUSETTS

ELECTRICAL SIDE SLIP FEELER

Application filed March 4, 1930. Serial No. 433,121.

This invention relates to improvements in electrically operating side slip feelers and it is the general object of the invention to provide a feeler of this type wherein current is conducted through surfaces which are kept in good contacting condition by the action of the feeler.

In Patent No. 1,738,198 to Payne there is shown a feeler having a sliding carrier upon which is pivotally mounted a side slipping yarn engaging detector arm. The arm and slide are both held in normal rearward position by a single spring, indication of weft exhaustion being given by angular movement of the detector while the sliding carrier is at rest. It is an important object of my present invention to provide a detector of this general type wherein pivotal movement of the detector arm will move a spring contact into electrical engagement with a fixed electrode of an electrical circuit, the spring which acts directly on the detector being sufficiently strong to overpower the contact spring and the latter cooperating with the main spring after indication has been given to return the detector to normal position.

It has been proposed heretofore to employ electrical connections for side slipping feelers but so far as I am aware the engagement between the oppositely charged members of the circuit has been a simple contact, so that if lint or foreign matter were present the circuit would not be closed. It is a further object of my present invention to provide an electrical detector so constructed that the side slipping angular movement of the detector will require a relative sliding between the oppositely charged contacting surfaces to remove any foreign matter and require direct metallic contact.

With these and other objects in view which will appear as the description proceeds, my invention resides in the combination and arrangement of parts hereinafter described and set forth in the claims.

Figure 1:
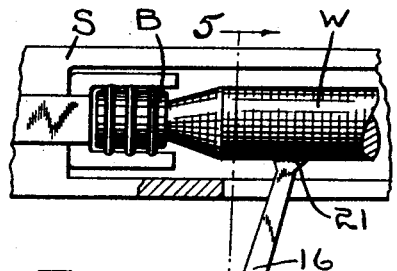
Figure 2:
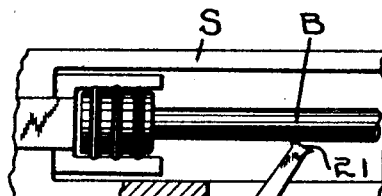
Figure 3:
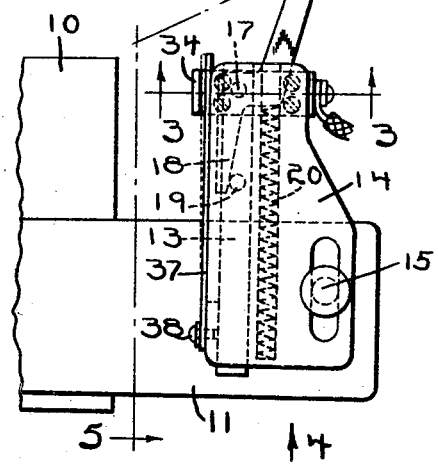
Figure 3:
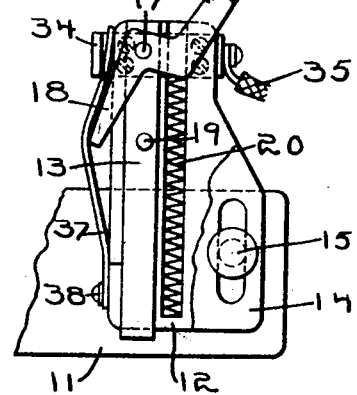
Figure 3:
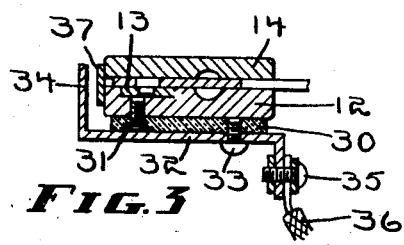
Figure 4:
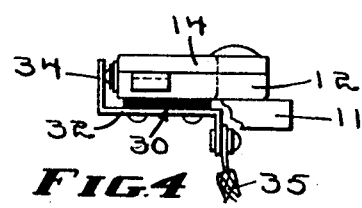
Figure 5:
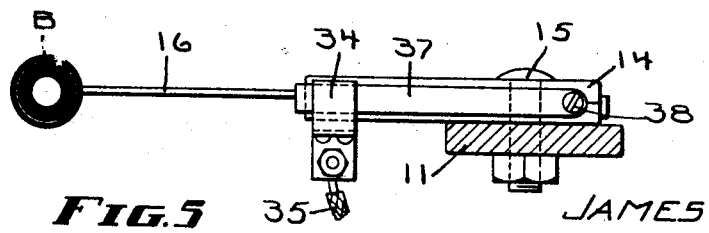

In the accompanying drawings, wherein a convenient embodiment of my invention is set forth, Fig. 1 is a top plan view of the detector made according to my present invention with the feeler in non-indicating position, contacting with a sufficient supply of weft, Fig. 2 is a view somewhat similar to Fig. 1 with the cap of the detector removed and the detector arm moved angularly to indicating position, the electrodes contacting with each other, Fig. 3 is a detailed vertical section on line 3—3 of Fig. 1, Fig. 4 is a front elevation taken in the direction of arrow 4, Fig. 1, a part of the stand being removed for the sake of clearness, and Fig. 5 is a detailed vertical section on line 5—5 of Fig. 1.

Referring to Figs. 1 and 2 I have shown a loom frame 10 having a stand 11 on which is mounted the bed 12 of a weft detector. There is slidably mounted in said bed a carrier 13 held in position by a cap 14. The cap and bed are held to the support by means of a bolt 15.

The detector arm 16 is pivotally mounted on stud 17 carried by the slide and has a forwardly extending finger 18 which is normally limited as to movement to the right by stop pin 19 rigid with the slide 13. A compression spring 20 is located between the bed and cap and exerts a rearward force on the detector arm tending to move the latter and also the slide to the rear normal position shown in Fig. 1. For purposes of illustration I have shown a shuttle S having a bobbin B with weft W to have contact with the rear roughened surface 21 of the detector arm 16.

When sufficient weft is present the detector arm and slide move forwardly against the action of spring 20, the arm 16 having no pivotal movement. When weft is absent, however, the arm slides along the denuded bobbin, pivoting about the stud 17 against the action of the spring 20, the latter holding the slide and stud practically stationary. When this latter action takes place the finger 18 will move to the left from the position shown in Fig. 1 to that shown in Fig. 2. The matter thus far described of itself forms no part of my present invention and may be as shown in the said Payne patent.

In carrying my improvements into effect I secure a block of insulating material 30 to the under side of the bed 12 by means of one or more screws 31 the heads of which are above the lower surface of said insulating block. I then secure to said block a contact plate 32 by means of screws 33 which are tapped into the block but are out of metallic contact with the detector bed. The plate has an upstanding arm 34 and may be connected as at 35 to one side of an electric circuit indicated by wire 36.

Secured to the forward end of the detector housing is a thin flexible leaf spring 37 formed of current conducting material, such as sheet steel, said strip being held in position by a screw 38 tapped directly into and having electric contact with the feeler housing. The rear end of said contact spring extends between the arm 34 and the adjacent portion of the feeler housing defined by the bed and cap 12 and 14, respectively. The parts are so proportioned that the spring normally lies close to the feeler casing out of contact with said upstanding arm and in position to be engaged by the finger 18.

In operation, when the detector arm swings to the position shown in Fig. 2 the form of the spring 37 will be changed to assume the shape suggested in Fig. 2. The first part of the action of indication as the feeler arm starts to slide along a denuded bobbin is to move the spring 37 to the dotted line position shown in Fig. 1, in which position said spring will be practically straight, and there will be contact between some portion of the arm 34 and the rear end of said spring. As the detector arm continues to swing about the stud 17 as a pivot there will be increasing deformation of the spring 37, causing that part of said spring in contact with the arm 34 to slide forwardly due to the fact that the front of said spring is held in fixed position. This action will be readily understood by a comparison of the dotted line position of the spring arm in Fig. 1 with the bent form of the spring shown in Fig. 2. It is in this way that I provide means for keeping the contact bright. Even if contact between the feeler casing and the forward end of the spring should become defective, as might result from corrosion or other cause, there will be a sliding contact between the finger 18 and the right hand surface of the spring 37 as viewed in Fig. 2, this contact also being sliding so as to keep the contacting surfaces bright.

It is thought unnecessary to show an electric circuit, inasmuch as the manner of stopping the loom or bringing about a change of filling in the depleted shuttle by electric means is well-known, and it is thought sufficient to state that when the spring 37 which is grounded to the frame of the loom either through the bed or by direct sliding engagement with the finger 18 has contact with the arm 34 which is insulated from the detector housing, electromagnetic means are set into action to effect a change in the operation of the loom.

As the spring 37 is deflected it will resist pivotal motion of the detector arm, but the coil spring 20 is sufficiently strong to hold the pivot of the detector arm substantially fixed and to permit the feeler arm to transmit to the leaf spring 37 sufficient force from the lay to overpower said leaf spring. As the lay recedes the leaf spring will assist in turning the detector arm back to normal position.

From the foregoing it will be seen that I have provided a simple attachment for a mechanically acting side slip feeler so arranged that pivotal movement of the detector arm will cause brightening of the contacts of the electrical circuit, this result being accomplished by a relative sliding of the contacting points. It will further be seen that the spring 37 is made of such form as to be easily deflected and not to interfere with the mechanical action of the detector, and also aid return swinging of the detector arm.

Having thus described my invention it will be seen that changes and modifications may be made therein by those skilled in the art without departing from the spirit and scope of the invention and I do not wish to be limited to the details herein disclosed, but what I claim is:

1. In an electrically indicating weft detector, a fixed support, a side slipping weft detector capable of angular and longitudinal movement with respect to said support when in contact with a denuded bobbin, an electric contact carried by but insulated from the support, and a flexible contact spring secured directly to the housing and positioned for engagement at a point intermediate its ends with a part of the detector arm, said spring normally being out of engagement with the first named contact and having one end movable into contact therewith by direct engagement with the detector arm as the latter has an indicating motion.

2. In an electrically indicating weft detector, a fixed support, a side slipping weft detector capable of angular and longitudinal movement with respect to said support when in contact with a denuded bobbin, a pair of contact elements carried by the support, one of said elements being insulated from and the other in electrical contact with the support, one of said elements being formed of a flexible leaf spring one end of which is anchored and the other end of which is capable of contact with the other element, said detector being placed to engage said flexible element between the anchored end thereof and the other element, said flexible element being movable by the detector arm when the latter has a detecting movement into contact with the other element.

3. In an electrically indicating weft detector, a fixed support, a side slipping weft detector capable of angular and longitudinal movement with respect to said support when in contact with a denuded bobbin, a contacting element carried by and fixed with respect to the support, and a pair of springs both capable of contact with the detector arm, both of said springs tending to restore the detector arm to normal position after a pivotal indicating movement, one of said springs being stronger than the other to determine the pivot of the detector arm, and the latter moving against the action of said stronger spring to move the weaker spring into electrical contact with said element.

4. In an electrically indicating weft detector, a fixed support, a side slipping weft detector capable of angular and longitudinal movement with respect to said support when in contact with a denuded bobbin, an electric contact, and a second contact having one end relatively fixed and the other end movable into engagement with the first contact, the detector engaging the second contact at a point between the ends thereof.

5. In an electrically indicating weft detector, a fixed support, a side slipping weft detector capable of angular and longitudinal movement with respect to said support when in contact with a denuded bobbin, an electric contact, and a second contact having one end relatively fixed and the other end movable into engagement with the first contact, the detector engaging the second contact at a point between the ends thereof, the fixed end of the second contact being in front of the other end, whereby advance movement of the detector when angularly disposed at indication tends to increase contact pressure between the said contacts.

In testimony whereof I have hereunto affixed my signature.

JAMES F. HARTMAN.